April 7, 1970  P. J. A. DE KINKELDER  3,504,854
LIQUID SPRAYING APPARATUS
Filed May 1, 1968  3 Sheets-Sheet 2
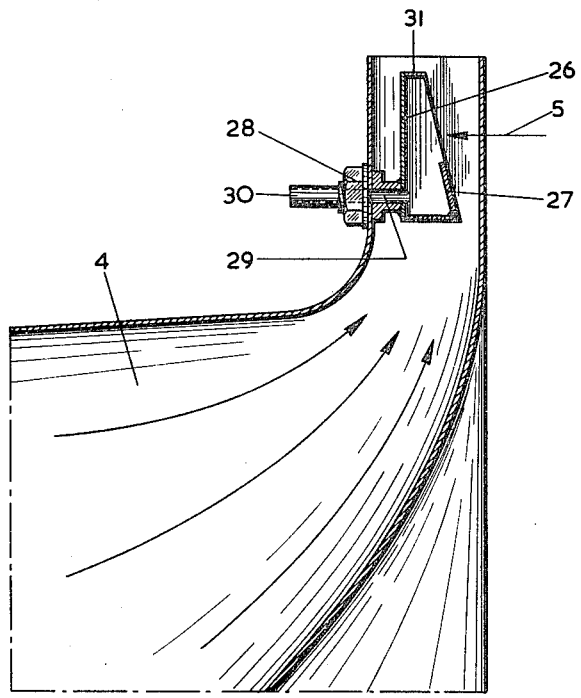
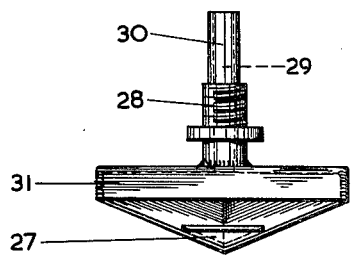
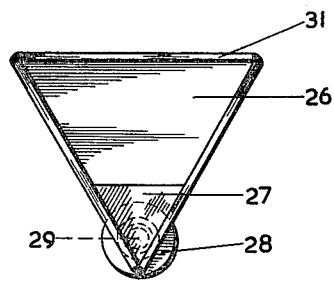

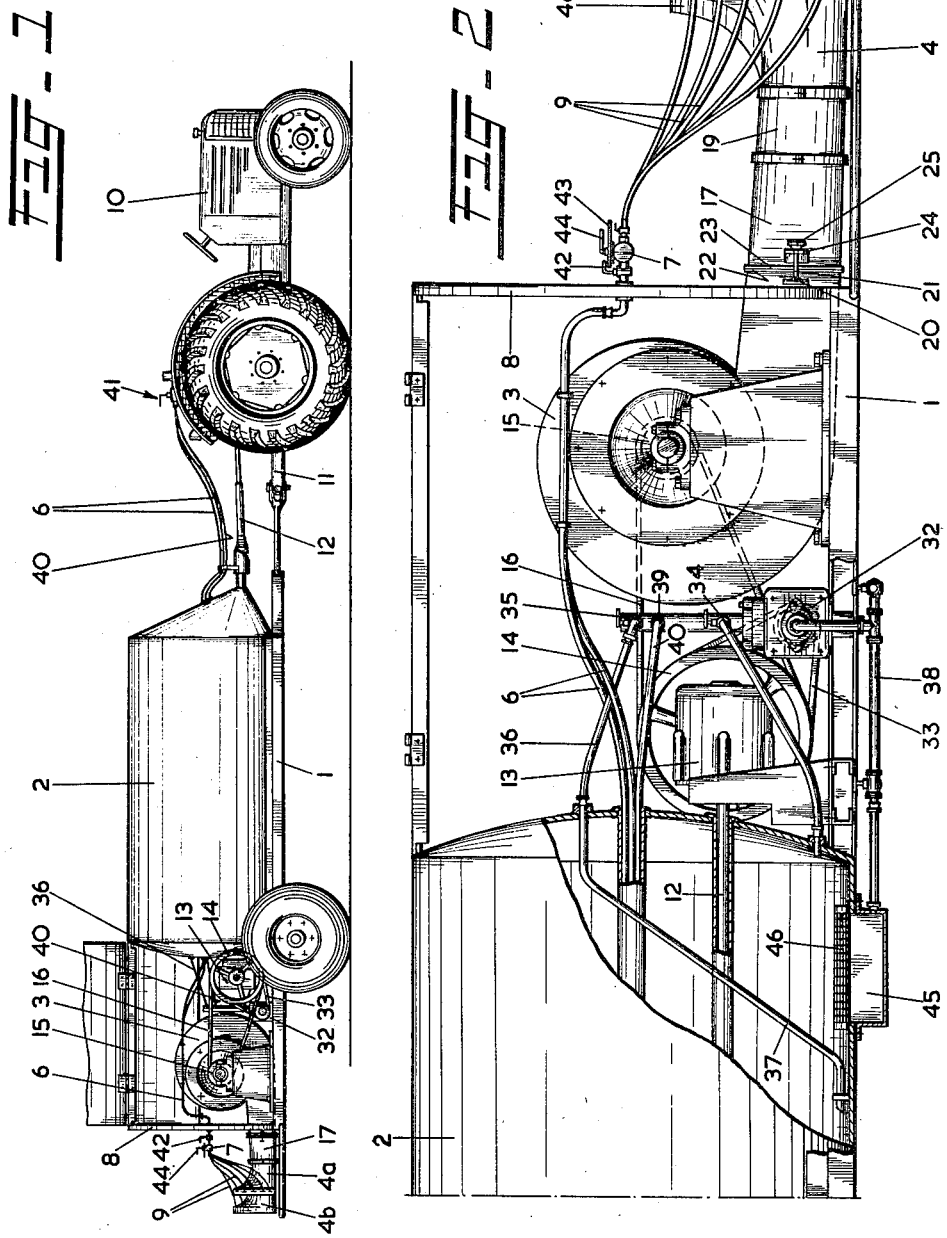

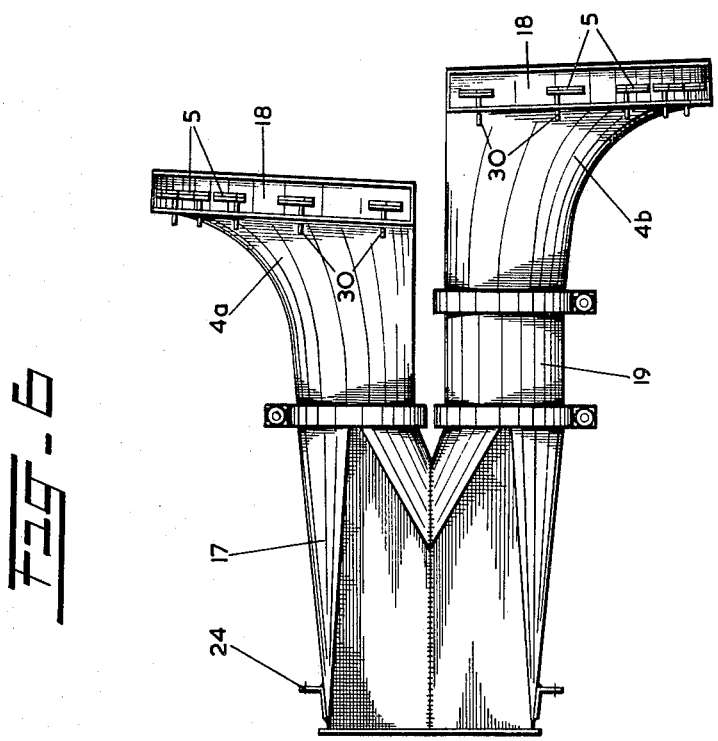

United States Patent Office 3,504,854
Patented Apr. 7, 1970

3,504,854
LIQUID SPRAYING APPARATUS
Petrus Johannes Alloysius de Kinkelder, Zuidelaan 42,
Zevenaar, Netherlands
Filed May 1, 1968, Ser. No. 725,673
Int. Cl. A01h 17/08
U.S. Cl. 239—78          8 Claims

ABSTRACT OF THE DISCLOSURE

A trailer mounted liquid sprayer towed and powered by a tractor having a centrifugal blower delivering air to a pair of quick release, pivotally mounted, outwardly flaring spray mouths. A low pressure pump delivers spray liquid from a tank to triangular-shaped diffusion chambers in the mouth openings through a distributor manifold. Push fitted pipes connect the spray liquid to the diffusion chambers.

This invention relates to an apparatus for spraying liquids, such as insecticides, fungicides, fertilizers and the like on trees and plants. The apparatus is carried on a tractor drawn trailer and is powered by a power take-off from the tractor engine.

The liquid spraying apparatus of this invention includes a centrifugal air blower delivering air to a pair of outwardly flaring spray mouths each subtending an angle of 90 degrees. The spray mouths lie side by side, and are pivotally connected to the blower outlet so that the overall spray pattern may be adjusted as desired. A quick release coupling is provided to permit easy changing of the spray mouths. The spray liquid is delivered from a tank to a plurality of liquid diffusion chambers mounted in the spray mouth edges or openings by a low pressure liquid pump. This enables simple push fittings at the diffusion chamber inlets to further facilitate spray mouth changing. The spray liquid is delivered via a valved manifold that permits adjustment of the fluid distribution. The liquid pump is also provided with an auxiliary outlet discharging into the bottom of the tank thereby agitating the spray liquid to ensure complete mixing and prevent sedimentation.

The diffusion chambers are generally triangular-shaped and are designed to produce a fog spray containing extremely small liquid droplets well suited to insure complete and even coverage of the plants or trees being sprayed.

All the foregoing and still further objects and advantages of the invention will become apparent from a study of the following specification taken in connection with the accompanying drawings wherein like characters of reference designate corresponding parts throughout the several views and in which:

FIGURE 1 is an elevational view of the spray arrangement according to the invention;

FIGURE 2 is an enlarged detail of the spray mouth structure;

FIGURE 3 shows a spray medium outlet means and the fastening of the same to the spray mouthpiece;

FIGURE 4 is an enlarged detail showing the embodiment of the spray medium outlet means;

FIGURE 5 is a front view of a spray medium outlet means according to FIGURE 4, and FIGURE 6 is an enlarged part of the spray mouth structure.

In FIGURE 1 the spray apparatus comprises a spray liquid tank 2 supported by a trailer frame 1, a centrifugal air blower 3 and a spray mouth structure 4a, 4b connected to the blower 3. The spray mouth structure is provided with a plurality of spray liquid outlets or diffusion chambers 5. The connection of the outlets 5 to the spray liquid tank 2 is accomplished by at least one pipe 6 for the supply of spray liquid to a distributor manifold 7 mounted on a supporting plate 8 fixed to frame 1. The distributor manifold is connected to outlets 5 in the spray mouth structure 4a, 4b by pipes 9 the number of which is equal to the number of outlets 5.

In the illustrated embodiment blower 3, which can be driven in any suitable manner, as for example, by a power source on the spray arrangement, is preferably driven by a power take-off of tractor 10. The tractor tows the spray apparatus over the ground to be treated. For this reason the tractor is coupled with the spray arrangement by a coupling 11. For the take-off drive a branch shaft 12 is present between tractor 10 and the spray arrangement which is led through tank 2 in any suitable way. The shaft end facing the spray mouth structure is connected to a gear system 13 for driving among other things air blower 3 via pulleys 14 and 15 and belt 16.

The spray mouth structure consists of two portions 4a and 4b in the form of outwardly flaring nozzles (see FIGURE 6) which are connected to the blower outlet via an intermediate air conduit 17. Each portion 4a and 4b respectively is fastened to conduit 17 so that it is rotatable around an axis perpendicular to supporting plate 8.

Since each portion ends in a cleft shaped opening 18 running a sector of nearly 90 degrees the spray liquid can be sprayed from the spray mouth over a sector of 180 degrees. By the fact that each portion 4a, 4b is rotatable, any desired combination of two spray sectors of nearly 90 degrees is possible. If the spray apparatus is moved between two planting rows portion 4a can be used for the planting row at the right side of the spray apparatus and portion 4b for the planting row at the left side.

In order to increase the number of possible spray sector combinations one of the portions (FIGURE 6, portion 4b) is connected to intermediate air conduit 17 via lengthening piece 19. In this manner the portions 4a and 4b may be swung or rotated with respect to each other so that, as seen in the direction of advance of the spray apparatus, these spray patterns overlap each other at least partly.

Conduit 17 is connected to the blower outlet so that it can be easily disengaged. This disengageable connection may have any suitable form. The spray apparatus shown in FIGURE 2 includes a so-called quick-release coupling. Projections 20 are placed at opposite sides of the blower outlet. Each projection 20 is provided with a hinged threaded bolt 21 and both connecting flanges 22 and 23 of the blower outlet and the conduit inlet 17, respectively, include recesses for accommodating the bolts 21. Furthermore, bolts 21 extend through openings in a lip 24 perpendicular to conduit 17 and include nuts 25. Conduit 17 is fixed to the blower outlet by tightening the nuts and is disengaged by loosening nuts 25 at both sides of the intermediate air conduit 17 and swinging outward bolts 21. By this disengageable connection it is possible to replace the spray mouth structure of the spray apparatus in a quick and simple manner with another spray mouth structure embodiment. Consequently, one spray apparatus can spray liquids of different viscosities to different heights over different patterns, thus rendering the invention appropriate for spraying both low and high plants.

As illustrated in FIGURE 2, pipes 9 from distributor 7 are connected to each of the outlets 5 of the spray mouth structure. A quick-release for the disengageable connection of intermediate conduit 17 to the blower outlet is only effective if pipes 9 can be similarly disengaged in a quick and simple manner from the relative outlets 5. In view hereof each outlet 5 is positioned (see FIGURE 3) near the end of the spray mouth structure 4a, 4b and consists of a sheet 26 mounted on the spray mouth structure wall by a bolt 28 so that the sheet 26 is parallel to the adjacent wall. Preferably the sheet 26 is triangular (FIGURE 5), the vertical angle being directed to the interior of the spray mouth structure. A strip shaped flange perpendiular to sheet 26 is provided along the legs of the triangle. At the vertical angle each strip shaped flange has a greater width than at the base of the triangle. The liquid to be sprayed is fed through perforated bolt 28 via the free end 30 which is connected to a pipe 9.

The base of plate 26 is provided with a strip like sheet 31 perpendicular to sheet 26 at its side remote from the adjacent spray mouth structure. A triangular sheet 27 is fixed to the free ends of the flanges near the vertical angle. Thus the spray liquid being fed through perforated bolt 28 collects in the space being formed by sheet 27 opposite part of sheet 26 and adjacent flange parts. The air flow in spray mouth structure 4a, 4b having a great intensity of current causes a depression above the liquid surface. Therefore the liquid is taken up and guided along sheet 26 and strikes against the strip-like sheet 31 at the base of the triangle, in which the liquid is distributed over the whole base of sheet 26 causing the formation of extremely small liquid particles which mix with the high velocity air flow causing a wide and evenly distributed spray pattern.

Consequently the spray medium leaves the spray mouth structure in the shape of an entirely closed fog screen sector consisting of liquid droplets of a magnitude of 70–80 microns. This is very suitable for fighting plant pests and disease with liquid insecticides and fungicides.

It will be obvious that in order to obtain the above mentioned haze-shaped spray effect a high pressure spray liquid supply to each outlet 5 is not necessary and is even undesirable. The spray liquid low pressure supply to each outlet means makes it possible to use a connection between 9 and pipe 30 which is easily disengageable. The end of pipe 9 is simply slipped on pipe 30 to form a push fitting. This is made possible by the low pressure supply of the spray liquid, and together with above described simple and quickly disengageable connection between the intermediate conduit 17 and the blower outlet, enables a quick and simple replacement of the spray mouth structure.

Spray liquid presure is generated by a pump 32 preferably positioned in the space between spray liquid tank 2 and supporting plate 8. The pump is driven via gear system 13 and a belt 33 driven by pulley 14. Pump 32 is preferably a centrifugal pump and has a branch pipe 34 for filling tank 2 and a branch pipe 35 which via a pipe 36 is connected to one end of a pipe 37 being in the tank, the other end of which lies at the bottom of the tank.

Spray liquid is carried off at the lower side of said tank through a sump 45 which communicates with the interior of the tank through a filter 46. A pipe 38 has one end connected to the sump and the other end is connected to centrifugal pump 32.

In operation the spray apparatus is moved over the ground to be treated by a tractor, and blower 2 and centrifugal pump 32 are driven by the power take-off of tractor 10. The spray liquid flows from tank 2 via sump 45, pipe 38 centrifugal pump 32, branch pipe 39 a pipe 40 to an operating panel 41 on tractor 10 and further via pipes 6, distributor manifold 7 and pipes 9 to outlets 5. By means of the operating panel having a valve for each pipe 6 the tractor driver can control the spray liquid supply to the spray mouth structure.

The intensity of the spray medium current is dependent on the function of pump 32. This function is dimensioned so that the overall pump output exceeds the dimensioned so that the overall pump output exceeds the supply to the outlets 5. The superfluous output is emptied via branch pipe 35 and pipes 36 and 37 in the bottom part of the tank. Thus during operation the spray liquid in tank 2 is effectively stirred and it is assured that the several components of the spray liquid are well mixed.

Although pipes 6 and also pipe 40 running from one side of spray liquid tank 2 to the other side can be placed outside the tank, in the preferred embodiment the pipes run through the bank via liquid light inlet means in the tank wall.

Since the spray mouth structure has two parts 4*a* and 4*b*, as is shown in the drawings, distributor manifold 7 has two chambers, one for each part. The spray liquid is supplied from operating panel 41 to the chambers via two pipes 6.

Near a chamber each pipe 6 is provided with a valve 42. By means of the valve spray liquid can be adjustably supplied to one or the other or both parts of the spray mouth structure. Near the connection to the relative distributor chamber each pipe 6 has an indicator for adjusting the spray liquid delivery via pipe 6. For that purpose the indicator is connected to a sensor within pipe 6 and consists of a pointer 44 and a dial 43.

While the invention has been particularly shown and described with reference to a preferred embodiment thereof, it will be understood by those skilled in the art that various changes in form and details may be made therein without departing from the spirit and scope of the invention.

What is claimed is:

1. A liquid spraying apparatus for chemical insecticides, fungicides, fertilizers and the like carried on a trailer frame adapted to be towed by a power driven vehicle, comprising:

(a) a spray liquid tank, (b) an air blower having an outlet, (c) a pair of outwardly flaring spray mouth nozzles each subtending an angle of approximately 90°, one nozzle extending beyond the other in a direction perpendicular to the planes of the nozzles, (d) quick release coupling means for detachably and rotatably connecting the spray mouth nozzles to the blower outlet, each nozzle being rotatable about respective axes perpendicular to the planes of the nozzles, (e) a plurality of low-pressure, spray liquid outlets opening within each of said nozzles and mounted along the flaring edges thereof, (f) a liquid distributor manifold having an inlet and a plurality of outlets, (g) a low-pressure liquid pump connected between the spray liquid tank and the manifold for supplying spray liquid to the manifold, and (h) a plurality of liquid delivery pipes individually connected between the distributor manifold outlets and the spray liquid outlets, the connections between the pipes and the spray liquid outlets being quick release, low-pressure push fittings.

2. A liquid spraying apparatus as defined in claim 1 wherein the distributor manifold has two chambers, one for respective pluralities of spray liquid outlets in each of the spray mouth nozzles.

3. A liquid spraying apparatus as defined in claim 1 wherein the connection between the liquid pump and the manifold is further provided with adjustable means for controlling the spray liquid supplied to the manifold.

4. A liquid spraying apparatus as defined in claim 3 wherein the adjustable means is adapted to be remotely located on the towing vehicle.

5. A liquid spraying apparatus as defined in claim 1 further including common driving means for driving both the air blower and the liquid pump and adapted to be driven by a power take-off on the towing vehicle.

6. A liquid spraying apparatus as defined in claim 1 wherein each spray liquid outlet comprises a triangular shaped diffusion chamber mounted parallel to the spray mouth means wall by a bolt having a central bore for the spray liquid and in which the vertical angle of the triangular shaped chamber is directed into the interior of the spray mouth means.

7. A liquid spraying apparatus as defined in claim 6 wherein the triangular shaped diffusion chamber comprises a first triangular plate, a strip plate perpendicular to the base of the first triangular plate, strip shaped flanges perpendicular to each leg of the first triangular plate and having greater widths at their vertical angle ends than at their base ends, and a second triangular plate smaller than the first overlying the free edges of the flanges adjacent the vertical angle end.

8. A liquid spraying apparatus as defined in claim 1 wherein the liquid pump is further provided with an outlet pipe having an end opening within and adjacent the bottom of the spray liquid tank, to thereby continuously agitate and mix the spray liquid in the tank.

References Cited

UNITED STATES PATENTS

| | | | |
|---|---|---|---|
| 3,097,794 | 7/1963 | Dawson | 239—78 |
| 3,130,909 | 4/1964 | Sanborn et al. | 239—78 |
| 3,138,329 | 6/1964 | Swanson | 239—77 |
| 3,164,324 | 1/1965 | Bruinsma | 239—77 |
| 3,252,656 | 5/1966 | Greenwood | 239—78 X |
| 3,269,657 | 8/1966 | Ballu. | |

M. HENSON WOOD, Jr., Primary Examiner

M. Y. MAR, Assistant Examiner

U.S. Cl. X.R.

239—142, 172, 594